No. 760,716. Patented May 24, 1904.

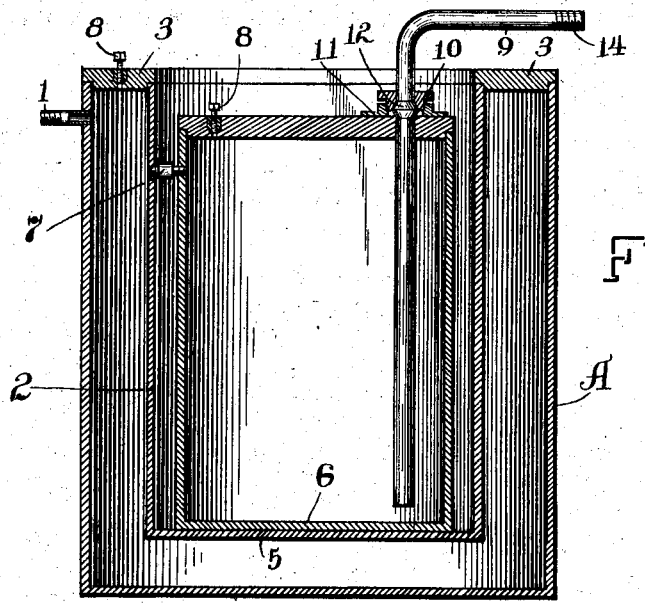
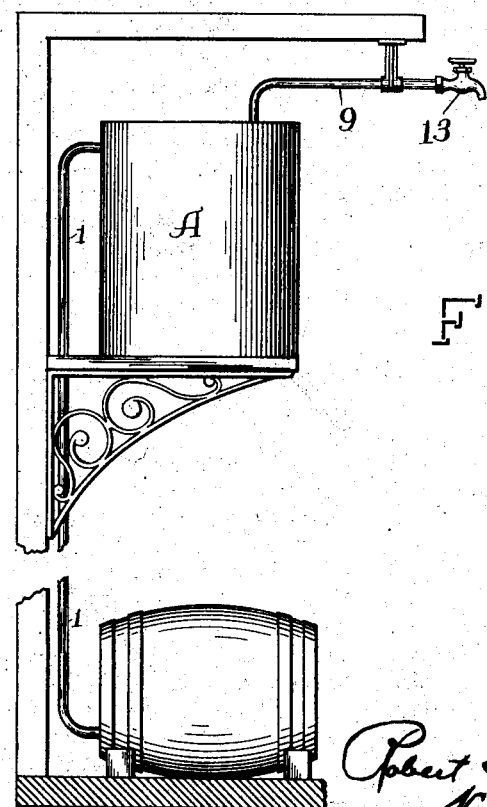

UNITED STATES PATENT OFFICE.

ROBERT S. WIESENFELD, OF BALTIMORE, MARYLAND.

BEER OR WATER COOLER.

SPECIFICATION forming part of Letters Patent No. 760,716, dated May 24, 1904.

Application filed January 5, 1904. Serial No. 187,770. (No model.)

*To all whom it may concern:*

Be it known that I, ROBERT S. WIESENFELD, a citizen of the United States, residing at Baltimore city, State of Maryland, have invented certain new and useful Improvements in a Combined Beer-Cooler and Ice-Water Device, of which the following is a specification.

My invention relates to an improvement in beer or water coolers, the object being to provide a simple construction which will be effectual for the purpose intended in cooling the beer during its passage from the keg or barrel to the spigot and one in which the entire outlet-pipe can be readily removed for cleaning.

With these objects in view my invention consists in certain novel features of construction and combinations of parts, which will be hereinafter described, and pointed out in the claim.

In the accompanying drawings, Figure 1 is a vertical section of my improved construction; and Fig. 2 is an illustration of its use, showing the relation of the keg or barrel, tank, and faucet.

A represents an outer tank, which may be termed the "supply-tank," into which the beer is permitted to flow through inlet-pipe 1, the beer of course being under pressure. The inner wall 2 is concentrically arranged and spaced apart by the cover 3, which is annular in form. This forms an annular supply-tank through the upper portion or, in fact, throughout, save at the bottom. The center is open, and resting upon the bottom 5 is the storage-tank 6, which has an annular cold-water space surrounding it, with a space over the top. This storage-tank and supply-tank are in communication through a pipe 7. The space around and above the storage-tank is adapted to be filled with cold water or cracked ice, or both, and the beer is kept cool by the surrounding cold medium. The beer is initially cooled in the supply-tank which surrounds and the inner wall of which is one of the walls of the cold-water chamber. Pin-valves 8 8 are provided in the upper ends of both the supply and storage tanks for permitting the escape of air.

The outlet-pipe 9 is removably held in the storage-tank by the gland 10, which screws into the ring 11, an enlargement 12 being preferably formed on the pipe as a means by which it is held seated rigidly on top of the storage-tank. A faucet or spigot 13 is adapted to be removably screwed on the threaded end 14 of the discharge-pipe.

It is obvious that a series of these tanks might be employed instead of one, or just as many as are required to cool the beer. It is also evident that other slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

A combined beer or water cooler comprising two communicating tanks, one of which has an open center, and the other resting therein with a surrounding space for the cooling medium, a pipe leading to the outer chamber to supply the contents to the tanks, a pipe leading from the inner chamber for the discharge of the beer or contents, and removable covers for both chambers.

In testimony whereof I affix my signature in presence of two witnesses.

ROBERT S. WIESENFELD.

Witnesses:
HENRY S. BREWINGTON,
ROBT. C. RHODES.